United States Patent
Sasao

(10) Patent No.: US 12,173,809 B2
(45) Date of Patent: Dec. 24, 2024

(54) CONSTANT-PRESSURE VALVE

(71) Applicant: ADVANCE DENKI KOGYO KABUSHIKI KAISHA, Kasugai (JP)

(72) Inventor: Kimihito Sasao, Kasugai (JP)

(73) Assignee: ADVANCE DENKI KOGYO KABUSHIKI KAISHA, Kasugai (JP)

( * ) Notice: Subject to any disclaimer, the term of this patent is extended or adjusted under 35 U.S.C. 154(b) by 56 days.

(21) Appl. No.: 18/139,221

(22) Filed: Apr. 25, 2023

(65) Prior Publication Data
US 2023/0349469 A1 Nov. 2, 2023

(30) Foreign Application Priority Data
Apr. 27, 2022 (JP) ................................. 2022-072875

(51) Int. Cl.
*F16K 31/126* (2006.01)
(52) U.S. Cl.
CPC ...... *F16K 31/1262* (2013.01); *F16K 31/1266* (2013.01); *F16K 2200/201* (2021.08)
(58) Field of Classification Search
CPC ............ F16K 31/1262; F16K 31/1266; G05D 16/0636
See application file for complete search history.

(56) References Cited

U.S. PATENT DOCUMENTS

| | | | | |
|---|---|---|---|---|
| 3,322,142 | A * | 5/1967 | Baumann | G05D 16/0658 251/335.1 |
| 6,575,187 | B2 * | 6/2003 | Leys | F16K 31/1262 137/625.5 |
| 10,968,924 | B2 * | 4/2021 | Gunell | F16K 11/048 |
| 10,969,025 | B2 * | 4/2021 | Matsuzawa | F16K 7/12 |
| 11,280,429 | B2 * | 3/2022 | Leys | F16K 27/0236 |
| 11,473,682 | B2 * | 10/2022 | Yoshino | F16K 7/17 |
| 11,713,823 | B2 * | 8/2023 | Armesto-Beyer | F16K 31/086 137/494 |
| 11,846,225 | B2 * | 12/2023 | Sassenrath | F16K 31/1268 |
| 11,867,316 | B2 * | 1/2024 | Sasao | F16K 31/1221 |

\* cited by examiner

*Primary Examiner* — Umashankar Venkatesan
(74) *Attorney, Agent, or Firm* — Kratz, Quintos & Hanson, LLP

(57) ABSTRACT

A valve body-side abutment surface 21x which is vertical to moving directions of the valve body 21 and the shaft 31 is formed on the valve body 21, a shaft-side abutment surface 31x which is vertical to the moving directions of the valve body 21 and the shaft 31 is formed on the shaft 31, a valve seat-side abutment surface 41x which is vertical to the moving directions of the valve body 21 and the shaft 31 is formed on the flow rate control passage 13, a valve-closing abutment portion 41y which projects in a ring-shape is formed on the valve body-side abutment surface 21x or the valve seat-side abutment surface 41x, a valve body-pressing abutment portion 31y which projects in a ring-shape is formed on the valve body-side abutment surface 21x or the shaft-side abutment surface 31x, the shaft 31 and the shaft-side diaphragm 32 are formed of composite material which is made by bonding PTFE and cross-linked PTFE to each other, the shaft-side diaphragm 32 is formed of the PTFE, and the shaft-side abutment surface 31x is formed of the cross-linked PTFE.

8 Claims, 4 Drawing Sheets

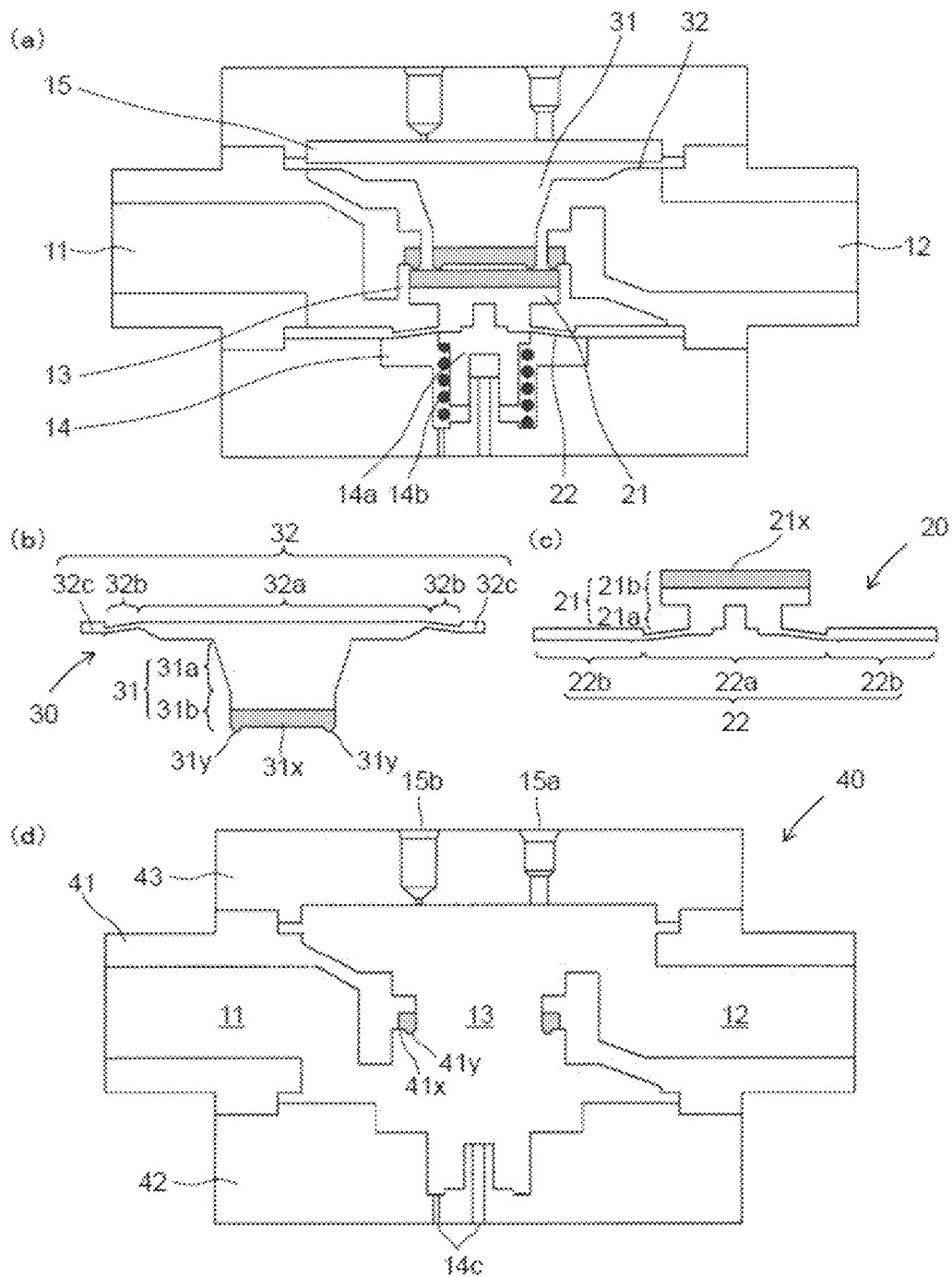

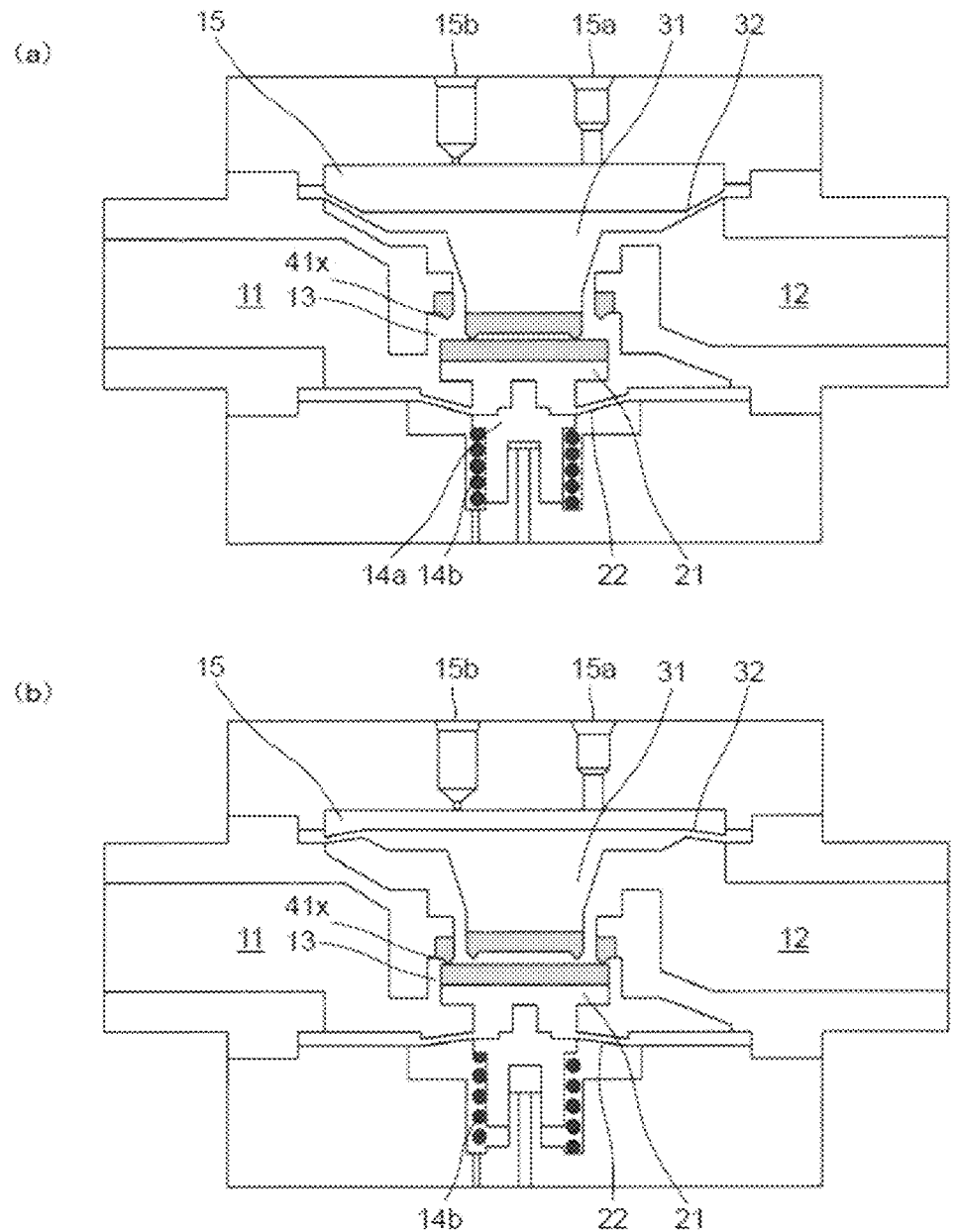
[FIGS. 2]

[FIG. 3]
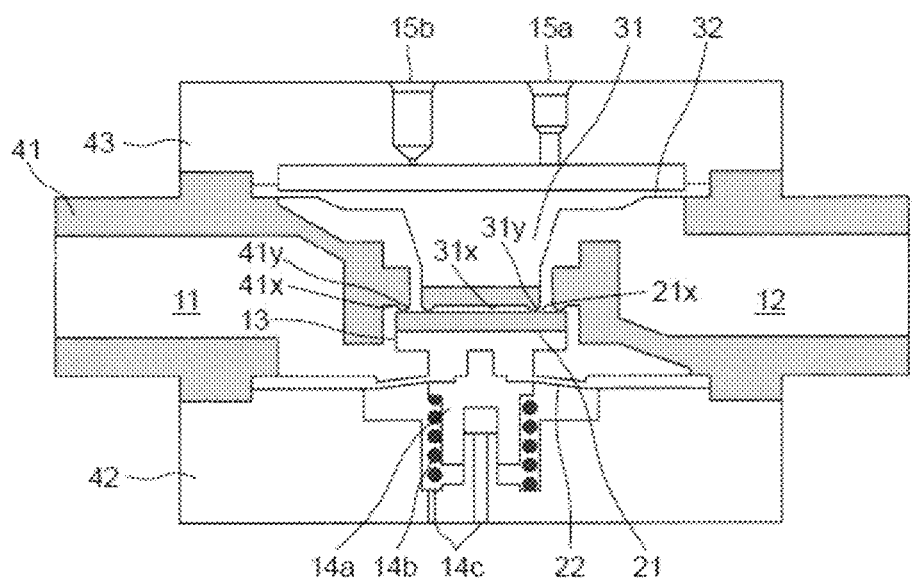

[FIG. 4]
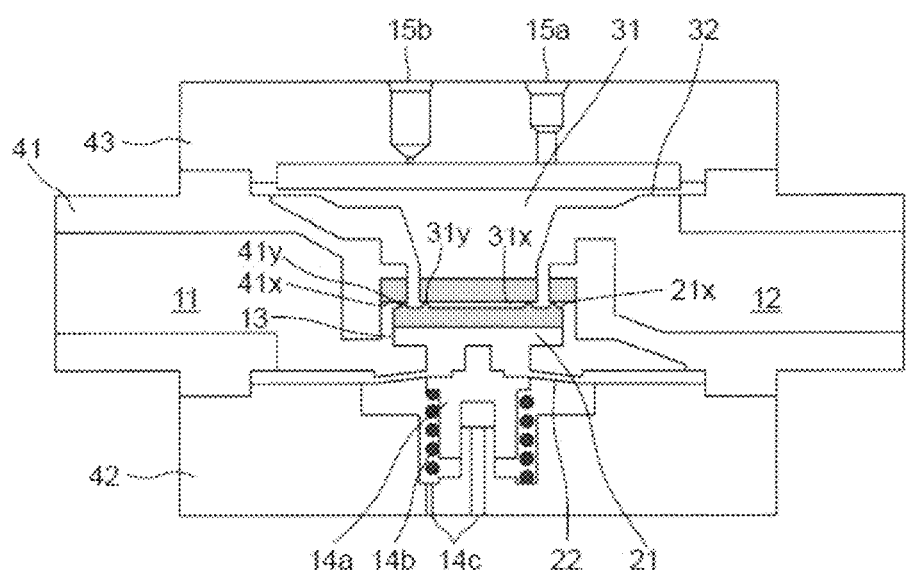

CONSTANT-PRESSURE VALVE

TECHNICAL FIELD

The present invention relates to a constant-pressure valve in which even if inflow side pressure caused by controlled fluid which flows in from an inflow passage is varied, outflow side pressure caused by controlled fluid which flows out from an outflow passage is maintained constant.

BACKGROUND TECHNIQUE

In cleaning and peeling steps of a silicon wafer process in semiconductor device production, chemical liquid having high corrosive properties such as strong acid and strong alkali is used.

In the case of the chemical liquid used in the cleaning and peeling steps and in which metal or organic material solute from a valve is unacceptable, extremely high cleanness is required. Therefore, as a valve through which chemical liquid flows, fluorine resin which is low elution material having excellent acid resistance and alkali resistance is employed.

If particles are mixed in a distribution channel of fluid in a semiconductor producing step, yield ratio of product is largely affected. Therefore, generation of particles from a valve is not allowed.

Therefore, as a supply valve of high-purity chemical liquid and ultrapure water, a structure for isolating a driving portion and a wetted portion from each other by a diaphragm is employed so that dust from a sliding portion does not affect a wetted portion of the valve.

For example, patent document 1 proposes a constant-pressure valve. This constant-pressure valve includes an inflow passage into which controlled fluid flows, an outflow passage from which the controlled fluid flows out, a flow rate control passage located between the inflow passage and the outflow passage, a valve body placed in the flow rate control passage, a valve body-side diaphragm for displacing the valve body, a shaft for pressing the valve body, and a shaft-side diaphragm for displacing the shaft, wherein the inflow passage is in communication with one side of the valve body-side diaphragm, and the valve body-side compression chamber is formed in the other side of the valve body-side diaphragm, the outflow passage is in communication with one side of the shaft-side diaphragm, and the shaft-side compression chamber is formed in the other side of the shaft-side diaphragm.

PRIOR ART DOCUMENTS

Patent Documents

[Patent Document 1] Japanese Patent Application Laid-open No. 2000-193106

SUMMARY OF THE INVENTION

Object to be Solved by the Invention

As a material which is excellent in chemical resistance and flexibility and which has long service life, there is PTFE (polytetrafluoroethylene).

However, nowadays, as miniaturization (10 nm process or smaller) of semiconductor producing process is developed, improvement against dust from a cut working surface is required, and even if PTFE is used, it is difficult to sufficiently satisfy the requirement.

Cross-linked PTFE has equivalent chemical resistance and flexibility to PTFE, and has more excellent abrasion resistance than PTFE, but since the number of producing steps is greater than PTFE, the cross-linked is more expensive, and it is difficult to compose the entire valve body of PTFE.

Therefore, it is an object of the present invention to provide a constant-pressure valve having, excellent flexibility of a diaphragm and capable of reducing production of particles.

Means for Solving Problem

A constant-pressure valve of the present invention described in claim 1 including: an inflow passage 11 into which controlled fluid flows; an outflow passage 12 from which the controlled fluid flows out; a flow rate control passage 13 located between the inflow passage 11 and the outflow passage 12; a valve body 21 placed in the flow rate control passage 13; a valve body-side diaphragm 22 which displaces the valve body 21; a shaft 31 which presses the valve body 21; and a shaft-side diaphragm 32 which displaces the shaft 31, in which the inflow passage 11 is in communication with one of sides of the valve body-side diaphragm 22, a valve body-side compression chamber 14 is formed in an other side of the valve body-side diaphragm 22, the outflow passage 12 is in communication with one of sides of the shaft-side diaphragm 32, and a shaft-side compression chamber 15 is formed in an other side of the shaft-side diaphragm 32, and even if inflow side pressure caused by the controlled fluid which flows in from the inflow passage 11 is varied, the valve body-side diaphragm 22 and the shaft-side diaphragm 32 are deformed, thereby constantly maintaining outflow side pressure caused by the controlled fluid which flows out from the outflow passage 12, wherein a valve body-side abutment surface 21$x$ which is vertical to moving directions of the valve body 21 and the shaft 31 is formed on the valve body 21, a shaft-side abutment surface 31$x$ which is vertical to the moving directions of the valve body 21 and the shaft 31 is formed on the shaft 31, a valve seat-side abutment surface 41$x$ which is vertical to the moving directions of the valve body 21 and the shaft 31 is formed on the flow rate control passage 13, a valve-closing abutment portion 41$y$ which projects in a ring-shape is formed on the valve body-side abutment surface 21$x$ or the valve seat-side abutment surface 41$x$, a valve body-pressing abutment portion 31$y$ which projects in a ring-shape is formed on the valve body-side abutment surface 21$x$ or the shaft-side abutment surface 31$x$, the shaft 31 and the shaft-side diaphragm 32 are formed of composite material which is made by bonding PTFE and cross-linked PTFE to each other, the shaft-side diaphragm 32 is formed of the PTFE, and the shaft-side abutment surface 31$x$ is formed of the cross-linked PTFE.

According to the invention described in claim 2, in the constant-pressure valve described in claim 1, the valve body 21 and the valve body-side diaphragm 22 are formed of the composite material, the valve body-side diaphragm 22 is formed of the PTFE, and the valve body-side abutment surface 21$x$ is formed of the cross-linked PTFE.

According to the invention described in claim 3, in the constant-pressure valve described in claim 1, the valve body-side abutment surface 21$x$ is formed of the cross-linked PTFE.

According to the invention described in claim 4, in the constant-pressure valve described in claim 1, the valve-closing abutment portion 41y and the valve body-pressing abutment portion 31y are formed of the cross-linked PTFE.

According to the invention described in claim 5, in the constant-pressure valve described in any one of claims 1 to 4, a passage-forming body 41, a valve body-side body 42 and a shaft-side body 43 constitute a body 40, the passage-forming body 41 forms the inflow passage 11, the outflow passage 12 and the flow rate control passage 13, the valve body-side body 42 forms the valve body-side compression chamber 14, the shaft-side body 43 forms the shaft-side compression chamber 15, the valve body-side diaphragm 22 is fixed to the passage-forming body 41 by the valve body-side body 42, the shaft-side diaphragm 32 is fixed to the passage-body 41 by the shaft-side body 43, the valve body-side body 42 and the shaft-side body 43 are formed of the PTFE, and the passage-forming body, 41 is formed of the cross-linked PTFE.

According to the invention described in claim 6, in the constant-pressure valve described in any one of claims 1 to 4, a passage-forming body 41, a valve body-side body 42 and a shaft-side body 43 constitute a body 40, the passage-forming body 41 forms the inflow passage 11, the outflow passage 12 and the flow rate control passage 13, the valve body-side body 42 forms the valve body-side compression chamber 14, the shaft-side body 43 forms the shaft-side compression chamber 15, the valve body-side diaphragm 22 is fixed to the passage-forming body 41 by the valve body-side body 42, the shaft-side diaphragm 32 is fixed to the passage-forming body 41 by the shaft-side body 43, the valve body-side body 42 and the shaft-side body 43 are formed of the PTFE, and the passage-forming body 41 is formed of PFA.

According to the invention described in claim 7, in the constant-pressure valve described min claim 6, the cross-linked PTFE which is bonded to the passage-forming body 41 by resistive heating is made as the valve seat-side abutment surface 41x.

According to the invention described in claim 8, in the constant-pressure valve described in claim 7, the valve seat-side abutment surface 41x is formed of the sheet-shaped cross-linked PTFE, and the valve-closing abutment portion 41y is formed on the valve body-side abutment surface 21x.

Effect of the Invention

According to the constant-pressure valve of the invention, the valve body-side abutment surface, the shaft-side abutment surface and the valve seat-side abutment surface are vertical to moving directions of the valve body and the shaft, the valve body-side abutment surface and the valve seat-side abutment surface are abutted against each other by the valve-closing abutment portion which projects in a ring-shape. The valve body-side abutment surface and the shaft-side abutment surface are abutted against each other by the valve body-pressing abutment portion which projects in a ring-shape. Therefore, it is possible to reduce generation of particles caused by abutment. The shaft and the shaft-side diaphragm are formed of composite material. Therefore, it is possible to reduce generation of particles as compared with a case where the shaft and the shaft-side diaphragm are formed of different members. Further, since the shaft-side diaphragm is formed of PTFE, flexibility is excellent, and since the shaft-side abutment surface is formed of cross-linked PTFE, it is possible to reduce generation of particles.

BRIEF DESCRIPTION OF THE DRAWINGS

FIG. 1 are sectional views showing a constant-pressure valve according to an embodiment of the present invention;

FIG. 2 are sectional views showing an operation state of the constant-pressure valve;

FIG. 3 is a sectional view showing a constant-pressure valve of another embodiment of the invention; and FIG. 4 is a sectional view showing a constant-pressure valve of further another embodiment of the invention.

MODE FOR CARRYING OUT THE INVENTION

In a constant-pressure valve according to a first embodiment of the present invention, a valve body-side abutment surface which is vertical to moving directions of the valve body and the shaft is formed on the valve body, a shaft-side abutment surface which is vertical to the moving directions of the valve body and the shaft is formed on the shaft, a valve seat-side abutment surface which is vertical to the moving directions of the valve body and the shaft is formed on the flow rate control passage, a valve-closing abutment portion which projects in a ring-shape is formed on the valve body-side abutment surface or the valve seat-side abutment surface, a valve body-pressing abutment portion which projects in a ring-shape is formed on the valve body-side abutment surface or the shaft-side abutment surface, the shaft and the shaft-side diaphragm are formed of composite material which is made by bonding FIFE and cross-linked PTFE to each other, the shaft-side diaphragm is formed of the PTFE, and the shaft-side abutment surface is formed of the cross-linked PTFE. According to this embodiment, the valve body-side abutment surface, the shaft-side abutment surface and the valve seat-side abutment surface are vertical to the moving directions of the valve body and the shaft, the valve body-side abutment surface and the valve seat-side abutment surface are abutted against each other by the valve body-pressing abutment portion which projects in a ring-shape. The valve body-side abutment surface and the shaft-side abutment surface are abutted against each other by the valve body-pressing abutment portion which projects in a ring-shape. Therefore, it is possible to reduce generation of particles caused by abutment. The shaft and the shaft-side diaphragm are formed of composite material. Therefore, it is possible to reduce generation of particles as compared with a case where the shaft and the shaft-side diaphragm are formed of different members. Further, since the shaft-side diaphragm is formed of PTFE, flexibility is excellent, and since the shaft-side abutment surface is formed of cross-linked PTFE, it is possible to reduce generation of particles.

According to a second embodiment of the invention, in the constant-pressure valve of the first embodiment, the valve body and the valve body-side diaphragm are formed of the composite material, the valve body-side diaphragm is formed of the PTFE, and the valve body-side abutment surface is formed of the cross-linked PTFE. According to this embodiment, since the valve body and the valve body-side diaphragm are formed of composite material, it is possible to reduce generation of particles as compared with a case where the valve body and the valve body-side diaphragm are formed of different members. Further, since the valve body-side diaphragm is formed of PTFE, flexibility is excellent, and since the valve body-side abutment surface is formed of cross-linked PTFE, it is possible to reduce generation of particles.

According to a third embodiment of the invention, in the constant-pressure valve of the first embodiment, the valve body-side abutment surface is formed of the cross-linked PTFE. According to this embodiment, since the valve body-side abutment surface is formed of cross-linked PTFE, it is possible to reduce generation of particles.

According to a fourth embodiment of the invention, in the constant-pressure valve of the first embodiment, the valve-closing abutment portion and the valve body-pressing abutment portion are formed of the cross-linked PTFE. According to this embodiment, since the valve-closing abutment portion and the valve body-pressing abutment portion are formed of cross-linked PTFE, it is possible to reduce generation of particles.

According to a fifth embodiment of the invention, in the constant-pressure valve of any one of the first to fourth embodiments, a passage-forming body, a valve body-side body and a shaft-side body constitute a body, the passage-forming body forms the inflow passage, the outflow passage and the flow rate control passage, the valve body-side body forms the valve body-side compression chamber, the shaft-side body forms the shaft-side compression chamber, the valve body-side diaphragm is fixed to the passage-forming body by the valve body-side body, the shaft-side diaphragm is fixed to the passage-forming body by the shaft-side body, the valve body-side body and the shaft-side body are formed of the PTFE, and the passage-forming body is formed of the cross-linked PTFE. According to this embodiment, since the passage-forming body is made of cross-linked PTFE, it is possible to reduce generation of particles.

According to a sixth embodiment of the invention, in the constant-pressure valve of any one of the first to fourth embodiments, a passage-forming body, a valve body-side body and a shaft-side body constitute a body, the passage-forming body forms the inflow passage, the outflow passage and the flow rate control passage, the valve body-side body forms the valve body-side compression chamber, the shaft-side body forms the shaft-side compression chamber, the valve body-side diaphragm is fixed to the passage-forming body by the valve body-side body, the shaft-side diaphragm is fixed to the passage-forming body by the shaft-side body, the valve body-side body and tile shaft-side body are formed of the PTFE, and the passage-forming body is formed of PFA. According to this embodiment, since PFA having low viscosity is used for the passage-forming body, it is possible to injection mold the passage-forming body.

According to a seventh embodiment of the invention, in the constant-pressure valve of the sixth embodiment, the cross-linked PTFE which is bonded to the passage-forming body by resistive heating is made as the valve seat-side abutment surface. According to this embodiment, the cross-linked PTFE is placed on the passage-forming body, and the heating block which is directly heated by resistive heating is pressed from the cross-linked PTFE side. Therefore, it is possible to bond the valve seat-side abutment surface. Since the cross-linked PTFE is directly heated to melting point temperature of the cross-linked PTFE or higher by the heating block. The cross-linked. PTFE is softened or semi-molten, and a surface of the passage-forming body made of PEA which comes into contact with the cross-linked PTFE is heated and molten by heating from the cross-linked PTFE. Therefore, strong bonding can be carried out. Further, by directly heating the cross-linked PTFE by the resistive heating, it is easy to control temperature at the contact interface, and it is possible to realize temperature control having high melting surface temperature responsiveness. Therefore, heating is limited to the contact interface, and deformation of the passage-forming body is not generated, and the cross-linked PTFE can be flattened.

According to an eighth embodiment of the invention, in the constant-pressure valve of the seventh embodiment, the valve seat-side abutment surface is formed of the sheet-shaped cross-linked PTFE, and the valve-closing abutment portion is formed on the valve body-side abutment surface. According to this embodiment, the valve seat-side abutment surface is formed of sheet-shaped cross-linked PTFE. Therefore, variation of melt flow rate is not prone to be generated, it is possible to maintain shape and weld bonding can be carried out, and it is possible to obtain homogeneous bonding strength.

EMBODIMENT

A constant-pressure valve according an embodiment of the present invention will be described below.

FIG. 1 are sectional views showing the constant-pressure valve according to the embodiment, wherein FIG. 1(a) shows the entire constant-pressure valve, FIG. 1(b) shows a shaft and a shaft-side diaphragm, FIG. 1(c) shows a valve body and a valve body-side diaphragm, and FIG. 1(d) shows a body.

The constant-pressure valve of the embodiment includes an inflow passage 11 into which controlled fluid flows, an outflow passage 12 from which the controlled fluid flows out, a flow rate control passage 13 located between the inflow passage 11 and the outflow passage 12, the valve body 21 placed in the flow rate control passage 13, the valve body-side diaphragm 22 which displaces the valve body 21, the shaft 31 which presses the valve body 21, and the shaft side diaphragm 32 which displaces the shaft 31.

In the constant-pressure valve of the embodiment, the inflow passage 11 is in communication with one side of the valve body-side diaphragm 22, a valve body-side compression chamber 14 is formed in the other side of the valve body-side diaphragm 22, the outflow passage 12 is in communication with one side of the shaft-side diaphragm 32, and a shaft-side compression chamber 15 is formed in the other side of the shaft-side diaphragm 32.

A pressing member 14a which presses the valve body-side diaphragm 22 is place in the valve body-side compression chamber 14. The pressing member 14a is biased toward the valve body-side diaphragm 22 by the resilient member 14b.

Pressurized gas is introduced into the shaft-side compression chamber 15, and the shaft-side diaphragm 32 is pressed by the introduced pressurized gas.

Although the valve body-side compression chamber 14 is provided with the resilient member 14b in this embodiment, the resilient member 14b and fluid, or only fluid instead of the resilient member 14h may bias the pressing member 14a.

Although pressurized gas is introduced into the shaft-side compression chamber 15 in the embodiment, a spring member may be provided together with pressurized gas, or only the spring member may be provided instead of pressurized gas.

In the drawings, black colors show cross-linked PTFE.

As shown in FIG. 1(b), the shaft 31 and the shaft-side diaphragm 32 are integrally molded together by resin as a shaft-side member 30. The shaft-side member 30 is formed of composite material which is formed by bonding PTFE (tetrafluroethylene resin) and cross-linked PTFE (tetrafluroethylene·perfluoroalkoxyethylene copolymer resin) to each other.

The cross-linked PTFE is formed by reaction which cross-links independent molecules to each other, and the cross-linked PTFE is formed by cross-linking method such as chemical cross-linking and radiation cross-linking for example. The cross-linked PTFE has abrasion resistance of 1,000 times or more of that of PTFE in sliding characteristics, and member which slides with the cross-linked. PTFE is less prone to be damaged. The cross-linked PTFE has high deformation resistance, and is less prone to be deformed, and the deformation resistance of the cross-linked PTFE is more excellent than PTFE at any of room temperature and high temperature. Workability such as cutting, welding and pasting, chemical resistance, nonadherent and electrical properties of the cross-linked PTFE are equal to those of PTFE. The PTFE and the cross-linked PTFE are bonded to each other by pressurizing heating bonding.

The shaft 31 includes a connecting portion 31a connected to the shaft-side diaphragm 32, and an abutment portion 31b which presses the valve body 21.

The connecting portion 31a is truncated conical in shape, a bottom surface of the connecting portion 31a is connected to the shaft-side diaphragm 32, and a ceiling surface of the connecting portion 31a is connected to the abutment portion 31b.

The abutment portion 31b is cylindrical in shape, one of end surfaces thereof is connected to the ceiling surface of the connecting portion 31a, and the other end surface thereof is a shaft-side abutment surface 31x.

The shaft-side abutment surface 31x is vertical to moving directions of the valve body 21 and the shaft 31.

A valve body-pressing abutment portion 31y which projects in a ring-shape is formed on the shaft-side abutment surface 31x. It is preferable that the valve body-pressing abutment portion 31y is formed on an outer periphery of the shaft-side abutment surface 31x. That is, it is preferable that an outer periphery of the valve body-pressing abutment portion 31y is equal to that of the abutment portion 31b.

The shaft-side diaphragm 32 includes a thick portion 32a connected to the shaft 31, a thin portion 32b formed on an outer periphery of the thick portion 32a, and a fixed portion 32c formed on an outer periphery of the thin portion 32b. The shaft-side diaphragm 32 is connected to the thick portion 32a at a central portion of the thick portion 32a.

The shaft-side diaphragm 32 is formed of PTFE, and the side abutment surface 31x and the valve body-pressing abutment portion 31y are formed of cross-linked PTFE.

In this embodiment, portions of the shaft-side diaphragm 32, the connecting portion 31a and the abutment portion 31b on the side closer to the connecting portion 31a are formed of PTFE, and a portion of the abutment portion 31b on the side closer to the side abutment surface 31x is formed of cross-linked PTFE.

As shown in FIG. 1(c), the valve body 21 and the valve body-side diaphragm 22 are integrally molded together by resin as a valve body-side member 20. The valve body-side member 20 is formed of composite material which is formed by bonding PTFE and cross-linked PTFE to each other.

The valve body 21 includes a connecting portion 21a connected to the valve body-side diaphragm 22, and an abutment portion 21b which is pressed by the shaft 31 and which abuts against a valve seat-side abutment surface 41x.

The connecting portion 21a is cylindrical in shape, one of end surfaces thereof is connected to the valve body-side diaphragm 22, and the other end surface thereof is connected to the abutment portion 21b.

The abutment portion 21b is cylindrical in shape, one of end surfaces thereof is connected to the other end surface of the connecting portion 21a, and the other end surface of the abutment portion 21b is a valve body-side abutment surface 21x.

An outer diameter of the abutment portion 21b is greater than that of the connecting portion 21a.

The valve body-side abutment surface 21x is vertical to moving directions of the valve body 21 and the shaft 31.

The valve body-side diaphragm 22 includes a thin portion 22a connected to the valve body 21, and a fixed portion 22b formed on an outer periphery of the thin portion 22a. The valve body-side diaphragm 22 is connected to the thin portion 22a at a central portion of the thin portion 22a.

The valve body-side diaphragm 22 is formed of PTFE, and the valve body-side abutment surface 21x is formed of cross-linked PTFE.

In this embodiment, the valve body-side diaphragm 22, the connecting portion 21a and the abutment portion 21b on the side closer to the connecting portion 21a are formed of PTFE, and the abutment portion 21b on the side closer to the valve body-side abutment surface 21x is formed of cross-linked PTFE.

As shown in FIG. 1(d), a body 40 includes a passage-forming body 41, a valve body-side body 42 and a shaft-side body 43.

The passage-forming body 41 forms the inflow passage 11, the outflow passage 12 and the flow rate control passage 13.

The valve body-side body 42 forms the valve body-side compression chamber 14 and a breathing hole 14c which is in communication with the valve body-side compression chamber 14.

The valve body-side member 20 is fixed to the passage-forming body 41 by the valve body-side body 42.

The shaft-side body 43 forms the shaft-side compression chamber 15. The shaft-side body 43 also forms a set-air port 15a and an exhaust port 15b which are in communication with the shaft-side compression chamber 15.

The shaft-side member 30 is fixed to the passage-forming body 41 by the shaft-side body 43.

The valve seat-side abutment surface 41x is formed on the flow rate control passage 13 as a surface which is vertical to moving directions of the valve body 21 and the shaft 31.

A valve-closing abutment portion 41y which projects in a ring-shape is formed on the valve seat-side abutment surface 41x, It s preferable that the valve-closing abutment portion 41y is formed on an inner periphery of the valve seat-side abutment surface 41x. That is, an inner periphery of the valve-closing abutment portion 41y is equal to that of the valve seat-side abutment surface 41x.

The valve seat-side abutment surface 41x and the valve-closing abutment portion 41y are formed of cross-linked PTFE. The passage-forming body 41, the valve body-side body 42 and the shaft-side body 43 other than the valve seat-side abutment surface 41x are formed of PTFE.

The valve seat-side abutment surface 41x and the valve-closing abutment portion 41y are formed of cross-linked PTFE. The passage-forming body 41 other than the valve seat-side abutment surface 41x is formed of PFA (tetrafluroethylene·perfluoroalkoxyethylene copolymer resin), and the valve body-side body 42 and the shaft-side body 43 are formed of PTFE.

Since PFA having low viscosity is used for the passage-forming body 41, it is possible to injection mold the passage-forming body 41.

To bond the valve seat-side abutment surface 41x formed of cross-linked PTFE to the passage-forming body 41 formed of PFA, cross-linked PTFE is placed on the passage-forming body 41, and a heating block which is heated directly by resistive heating is pressed from the cross-linked PTFE side. By heating the cross-linked PTFE directly by the heating block to melting point temperature of the cross-linked PTFE higher, the cross-linked PTFE is softened or semi-molten. If the passage-forming body 41 formed of PFA is heated from the cross-linked PTFE, interface of the passage-forming body 41 which contacts the cross-linked PTFE is heated and molten and therefore, strong bonding can be carried out. By heating the cross-linked PTFE directly by the resistive heating, it is possible to easily control temperature at the contact interface, and it is possible to realize temperature control of high melting surface temperature responsiveness. Therefore, since heating is to the contact interface, the passage-forming body 41 is not deformed, and the cross-linked PTFE can be flattened.

To form the valve seat-side abutment surface 41x, it is preferable to use sheet-shaped cross-linked PTFE having 0.05 mm to 0.5 mm thickness. If the sheet-shaped cross-linked PTFE is thinner than 0.05 mm, PFA infiltrates and reaches a seal surface in some cases, and if the sheet-shaped cross-linked PTFE is thicker than 0.5 mm, melting time becomes long and the passage-forming body 41 is deformed in some cases.

By bonding the valve seat-side abutment surface 41x formed of cross-linked PTFE to the passage-forming body 41 formed of PFA in this manner, the valve seat-side abutment surface 41x can be bonded to the passage-forming body 41 by bonding strength which exceeds strength of friction bonding caused by entangling of polymer molecule.

If the valve seat-side abutment surface 41x is formed of the sheet-shaped cross-linked PTFE, melt flow rate is less prone to be varied, shape of the valve seat-side abutment surface 41x can be maintained, it can be weld-bonded, and homogeneous bonding strength can be obtained. In this case, the valve-closing abutment portion 41y is formed on the valve body-side abutment surface 21x as shown in FIG. 4.

FIG. 2 are sectional views showing an operation state of the constant-pressure valve of the embodiment, wherein FIG. 2(a) shows a state where controlled fluid flows, and FIG. 2(b) shows a state where outflow side pressure becomes high.

As shown in FIG. 2(a), controlled fluid which flows in from the inflow passage 11 passes through the flow rate control passage 13, and flows out from the outflow passage 12.

The shaft-side diaphragm 32 is deformed in a direction where the shaft 31 presses the valve body 21 by gas pressure of the shaft-side compression chamber 15. Pressurized gas is introduced from the set-air port 15a or the pressurized gas is discharged from the exhaust port 15b. According to this, set pressure of the shaft-side compression chamber 15 is adjusted.

The valve body-side diaphragm 22 is deformed in a direction where the valve body 21 presses the shaft 31 by pressing pressure of the valve body-side compression chamber 14. The pressing pressure of the valve body-side compression chamber 14 is set by the resilient member 14b.

As shown in FIG. 2(a), in a state where controlled fluid flows to the flow rate control passage 13, the shaft 31 presses the valve body 21 by the shaft-side diaphragm 32, and the valve body 21 presses the shaft 31 by the valve body-side diaphragm 22. Therefore, the valve body 21 and the shaft 31 abut against each other.

In a state shown in FIG. 2(a), if inflow side pressure caused by controlled fluid which flows in from the inflow passage 11 rises and the inflow side pressure becomes higher than set pressure, the shaft-side diaphragm 32 is displaced in a direction where the shaft 31 separates from the valve body 21 by the inflow side pressure.

If the shaft 31 is displaced in a direction where the shaft 31 separates from the valve body 21, the valve body 21 is displaced together with the shaft 31. That is, since the valve body 21 is displaced in a direction where the valve body 21 comes close to the valve seat-side abutment surface 41x. Therefore, the flow rate control passage 13 is narrowed.

If the flow rate control passage 13 is narrowed, it is possible to prevent the outflow side pressure caused by controlled fluid which flows out from the outflow passage 12 from rising.

In a state shown in FIG. 2(a), if the inflow side pressure caused by controlled fluid which flows in from the inflow passage 11 drops and becomes lower than the set pressure, the shaft-side diaphragm 32 is displaced in a direction where the shaft 31 presses the valve body 21.

If the shaft 31 is displaced in a direction where the shaft 31 presses the valve body 21, the valve body 21 is displaced. That is, since the valve body 21 is displaced in a direction where the valve body 21 separates from the valve seat-side abutment surface 41x, the flow rate control passage 13 is widened.

If the flow rate control passage 13 is widened, it is possible to prevent the outflow side pressure caused by controlled fluid which flows out from the outflow passage 12 from dropping.

As described above, according to the constant-pressure valve of the embodiment, even if inflow side pressure caused by controlled fluid which flows in from the inflow passage 11 is varied, since the shaft-side diaphragm 32 is deformed, it is possible to constantly maintain the outflow side pressure caused by controlled fluid which flows out from the outflow passage 12. Since the valve body 21 is displaced together with the shaft 31, the valve body-side diaphragm 22 is also displaced together with variation in the inflow side pressure.

FIG. 2(b) shows a state where the outflow side pressure becomes high.

If the outflow side pressure becomes high, the shaft-side diaphragm 32 is displaced in a direction where the shaft 31 separates from the valve body 21 by the outflow side pressure.

If the shaft-side diaphragm 32 is displaced in the direction where the shaft 31 separates from the valve body 21, the valve body 21 is displaced together with the shaft 31, and the valve body 21 abuts against the valve seat-side abutment surface 41x.

Also in a state where the valve body 21 abuts against the valve seat-side abutment surface 41x, if the outflow side pressure is higher than the set pressure, the shaft 31 separates from the valve body 21 as shown in FIG. 2(b).

Therefore, the outflow side pressure becomes high, and even if the valve body 21 abuts against the valve seat-side abutment surface 41x, only pressing pressure caused by the resilient member 14b is applied to the valve body 21, and a load caused by the outflow side pressure is not applied to the valve body 21.

FIG. 3 is a sectional view showing a constant-pressure valve according to another embodiment of the invention.

The same symbols are allocated to members having the same functions as those of the previous embodiment, and description thereof is omitted.

This embodiment is different from the previous embodiment in that the passage-forming body 41 is formed of cross-linked PTFE, and other configurations are the same.

The entire passage-forming body 41 is formed of the cross-linked PTFE as in this embodiment, generation of particles in the inflow passage 11, the outflow passage 12 and the flow rate control passage 13 can be reduced.

FIG. 4 is a sectional view showing a constant-pressure valve of further another embodiment of the invention.

The same symbols are allocated to members having the same functions as those of the previous embodiment, and description thereof is omitted.

This embodiment is different from the previous embodiment in that the valve body-side abutment surface 21x is provided with the valve body-pressing abutment portion 31y and the valve-closing abutment portion 41y, and other configurations are the same.

As in this embodiment, the valve body-pressing abutment portion 31y may not be formed on the side abutment surface 31x, the valve-closing abutment portion 41y may not be formed on the valve seat-side abutment surface 41x, and the valve body-pressing abutment portion 31y and the valve-closing abutment portion 41y may be formed on the valve body-side abutment surface 21x.

The embodiment shown in FIG. 3 may be applied to the embodiment shown in FIG. 4.

As described above, according to this embodiment, the valve body-side abutment surface 21x, the side abutment surface 31x and the valve seat-side abutment surface 41x are vertical to moving directions of the valve body 21 and the shaft 31, the valve body-side abutment surface 21x and the valve seat-side abutment surface 41x abut against each other through the valve-closing abutment portion 41y which projects in the ring-shape, and the valve body-side abutment surface 21x and the side abutment surface 31x abut against each other through the valve body-pressing abutment portion 31y which projects in the ring-shape. Therefore, generation of particles caused by abutment can be reduced. Since the shaft 31 and the shaft-side diaphragm 32 are formed of composite material, generation of particles can be reduced as compared with a case where the shaft 31 and the shaft-side diaphragm 32 are formed of different members. Further, since the shaft-side diaphragm 32 is formed of PTFE, flexibility thereof is excellent, and since the side abutment surface 31x is formed of cross-linked PTFE, generation of particles can be reduced.

Further, according to this embodiment, since the valve body 21 and the valve body-side diaphragm 22 are formed of composite material, generation of particles can be reduced as compared with a case where the valve body 21 and the valve body-side diaphragm 22 are formed of different members. Since the valve body-side diaphragm 22 is formed of PTFE flexibility thereof is excellent, and since the valve body-side abutment surface 21x is formed of cross-linked PTFE, generation of particles can be reduced.

According to this embodiment, since the valve body-side abutment surface 21x is formed of cross-linked PTFE, generation of particles can be reduced Further, according to the embodiment, since the valve-closing abutment portion 41y and the valve body-pressing abutment portion 31y are formed of cross-linked PTFE, generation of particles can be reduced.

According to the embodiment, since the passage-forming body is formed of cross-linked PTFE, generation of particles can be reduced.

Concerning the constant-pressure valve shown in FIGS. 1 and 2, demonstration experiment of a generation amount of particles was carried out while taking a case where all of members are formed of PTFE as a comparative example. As a result, in the constant-pressure valve of the embodiment, the generation amount of particles of 15 nm or less was reduced to 1/10 in a steady control state as compared with the comparative example.

INDUSTRIAL APPLICABILITY

The present invention is suitable for a constant-pressure valve which requires precise flow rate control and high cleanness in a semiconductor producing field.

EXPLANATION OF SYMBOLS 11 inflow passage
12 outflow passage
13 flow rate control passage
14 valve body-side compression chamber
14a pressing member
14b resilient member
14c breathing hole
15 shaft-side compression chamber
15a setting air port
15b exhaust port
21 valve body
21a connecting portion
21b abutment portion
21x valve body-side abutment surface
22 valve body-side diaphragm
22a thin portion
22b fixed portion
30 shaft-side member
31 shaft
31a connecting portion
31b abutment portion
31x shaft-side abutment surface
31y valve body-pressing abutment portion
32 shaft-side diaphragm
32a thick portion
32b thin portion
32d fixed portion
40 body
41 passage-forming body
41x valve seat-side abutment surface
41y valve-closing abutment portion
42 valve body-side body
43 shaft-side body

The invention claimed is:

1. A constant-pressure valve comprising:
an inflow passage into which controlled fluid flows;
an outflow passage from which the controlled fluid flows out;
a flow rate control passage located between the inflow passage and the outflow passage;
a valve body placed in the flow rate control passage;
a valve body-side diaphragm which displaces the valve body;
a shaft which presses the valve body; and
a shaft-side diaphragm which displaces the shaft, in which the inflow passage is in communication with one of sides of the valve body-side diaphragm, a valve body-side compression chamber is formed in an other side of the valve body-side diaphragm, the outflow passage is in communication with one of sides of the shaft-side diaphragm, and a shaft-side compression chamber is formed in an other side of the shaft-side diaphragm, and even if inflow side pressure caused by the controlled fluid which flows in from the inflow passage is varied, the valve body-side diaphragm and the shaft-side diaphragm are deformed, thereby constantly maintaining outflow side pressure caused by the controlled fluid which flows out from the outflow passage, wherein a valve body-side abutment surface which is vertical to moving directions of the valve body and the shaft is formed on the valve body, a shaft-side abutment surface which is vertical to the moving directions of the valve body and the shaft is formed on the shaft, a valve seat-side abutment surface which is vertical to the moving directions of the valve body and the shaft is formed on the flow rate control passage, a valve-closing abutment portion which projects in a ring-shape is formed on the valve body-side abutment surface or the valve seat-side abutment surface, a valve body-pressing abutment portion which projects in a ring-shape is formed on the valve body-side abutment surface or the shaft-side abutment surface, the shaft and the shaft-side diaphragm are formed of composite material which is made by bonding PTFE and cross-linked PTFE to each other, the shaft-side diaphragm is formed of the PTFE, and the shaft-side abutment surface is formed of the cross-linked PTFE.

2. The constant-pressure valve according to claim 1, wherein the valve body and the valve body-side diaphragm are formed of the composite material, the valve body-side diaphragm is formed of the PTFE, and the valve body-side abutment surface is formed of the cross-linked PTFE.

3. The constant-pressure valve according to claim 1, wherein the valve body-side abutment surface is formed of the cross-linked PTFE.

4. The constant-pressure valve according to claim 1, wherein the valve-closing abutment portion and the valve body-pressing abutment portion are formed of the cross-linked PTFE.

5. The constant-pressure valve according to claim 1, wherein a passage-forming body, a valve body-side body and a shaft-side body constitute a body, the passage-forming body forms the inflow passage, the outflow passage and the flow rate control passage, the valve body-side body forms the valve body-side compression chamber, the shaft-side body forms the shaft-side compression chamber, the valve body-side diaphragm is fixed to the passage-forming body by the valve body-side body, the shaft-side diaphragm is fixed to the passage-forming body by the shaft-side body, the valve body-side body and the shaft-side body are formed of the PTFE, and the passage-forming body is formed of the cross-linked PTFE.

6. The constant-pressure valve according to claim 1, wherein a passage-forming body, a valve body-side body and a shaft-side body constitute a body, the passage-forming body forms the inflow passage, the outflow passage and the flow rate control passage, the valve body-side body forms the valve body-side compression chamber, the shaft-side body forms the shaft-side compression chamber, the valve body-side diaphragm is fixed to the passage-forming body by the valve body-side body, the shaft-side diaphragm is fixed to the passage-forming body by the shaft-side body, the valve body-side body and the shaft-side body are formed of the PTFE, and the passage-forming body is formed of PFA.

7. The constant-pressure valve according to claim 6, wherein the cross-linked PTFE which is bonded to the passage-forming body by resistive heating is made as the valve seat-side abutment surface.

8. The constant-pressure valve according to claim 7, wherein the valve seat-side abutment surface is formed of the sheet-shaped cross-linked PTFE, and the valve-closing abutment portion is formed on the valve body-side abutment surface.

\* \* \* \* \*